(12) United States Patent
McLean et al.

(10) Patent No.: US 8,551,637 B2
(45) Date of Patent: *Oct. 8, 2013

(54) MEMBRANES AND ELECTROCHEMICAL CELLS INCORPORATING SUCH MEMBRANES

(75) Inventors: Gerard F. McLean, West Vancouver (CA); Tran Ngo, North Vancouver (CA); Ned Djilali, North Vancouver (CA); Anna Stukas, Vancouver (CA); Jeremy Schrooten, Mission (CA)

(73) Assignee: Societe BIC, Clichy (FR)

( * ) Notice: Subject to any disclaimer, the term of this patent is extended or adjusted under 35 U.S.C. 154(b) by 938 days.

This patent is subject to a terminal disclaimer.

(21) Appl. No.: 12/126,811

(22) Filed: May 23, 2008

(65) Prior Publication Data

US 2008/0220210 A1 Sep. 11, 2008

Related U.S. Application Data

(63) Continuation of application No. 11/047,558, filed on Feb. 2, 2005, now Pat. No. 7,378,176.

(60) Provisional application No. 60/567,437, filed on May 4, 2004.

(51) Int. Cl.
*H01M 8/00* (2006.01)
*C25B 13/00* (2006.01)

(52) U.S. Cl.
USPC .......................................... 429/129; 428/135

(58) Field of Classification Search
USPC ......... 429/129; 428/135, 136, 138; 427/271, 427/555
See application file for complete search history.

(56) References Cited

U.S. PATENT DOCUMENTS

| | | | |
|---|---|---|---|
| 3,402,230 | A | 9/1968 | White, Jr. |
| 5,160,627 | A | 11/1992 | Cussler et al. |
| 5,171,646 | A | 12/1992 | Rohr |
| 5,190,834 | A | 3/1993 | Kendall |
| 5,310,765 | A | 5/1994 | Banerjee et al. |
| 5,364,711 | A | 11/1994 | Yamada et al. |
| 5,432,023 | A | 7/1995 | Yamada et al. |

(Continued)

FOREIGN PATENT DOCUMENTS

| CA | 2408587 | 12/2001 |
|---|---|---|
| CA | 2408587AA | 12/2001 |

(Continued)

OTHER PUBLICATIONS

"Chinese Application Serial No. 200580018092.5, Office Action mailed Feb. 6, 2009", (w/ English Translation), 13 pgs.

(Continued)

*Primary Examiner* — Mark F Huff
*Assistant Examiner* — Monique Wills
(74) *Attorney, Agent, or Firm* — Schwegman Lundberg & Woessner, P.A.

(57) ABSTRACT

One aspect of the invention provides an ion-conducting membrane comprising an ion-conducting region and a non-ion-conducting region. The ion-conducting region is formed by a plurality of ion-conducting passageways that extend through the membrane. The passageways are filled with ion-conducting material and may be surrounded by non-ion conducting material. The membrane may comprise a substrate of non-ion-conducting material that is penetrated by openings, each opening providing a corresponding one of the passageways.

50 Claims, 9 Drawing Sheets

(56) References Cited

U.S. PATENT DOCUMENTS

| | | | |
|---|---|---|---|
| 5,468,574 A | 11/1995 | Ehrenberg et al. | |
| 5,547,551 A | 8/1996 | Bahar et al. | |
| 5,587,253 A | 12/1996 | Gozdz et al. | |
| 5,599,614 A | 2/1997 | Bahar et al. | |
| 5,635,041 A | 6/1997 | Bahar et al. | |
| 5,679,482 A | 10/1997 | Ehrenberg et al. | |
| 5,709,961 A | 1/1998 | Cisar et al. | |
| 5,783,324 A | 7/1998 | Binder et al. | |
| 5,853,916 A * | 12/1998 | Venugopal et al. | 429/303 |
| 5,861,221 A | 1/1999 | Ledjeff et al. | |
| 5,863,672 A | 1/1999 | Ledjeff et al. | |
| 5,925,477 A | 7/1999 | Ledjeff et al. | |
| 5,952,118 A | 9/1999 | Ledjeff et al. | |
| 5,989,741 A | 11/1999 | Bloomfield et al. | |
| 6,127,058 A | 10/2000 | Pratt et al. | |
| 6,544,400 B2 | 4/2003 | Hockaday et al. | |
| 6,551,745 B2 | 4/2003 | Moutsios et al. | |
| 6,579,643 B1 | 6/2003 | Gozdz | |
| 6,582,847 B1 | 6/2003 | Bruck et al. | |
| 6,613,203 B1 | 9/2003 | Hobson et al. | |
| 6,641,862 B1 | 11/2003 | Grot | |
| 6,680,139 B2 | 1/2004 | Narayanan et al. | |
| 6,813,203 B2 | 11/2004 | Nakagawa | |
| 6,815,121 B2 | 11/2004 | Dasgupta et al. | |
| 6,933,077 B2 | 8/2005 | Sudano et al. | |
| 7,078,361 B2 | 7/2006 | Cisar et al. | |
| 7,118,826 B2 | 10/2006 | O'Neil et al. | |
| 7,153,601 B2 | 12/2006 | Mardilovich et al. | |
| 7,223,491 B2 | 5/2007 | McLean et al. | |
| 7,226,646 B2 | 6/2007 | McLean et al. | |
| 7,229,564 B2 | 6/2007 | Liu et al. | |
| 7,314,677 B2 | 1/2008 | Mosdale | |
| 7,323,266 B2 | 1/2008 | Morishima et al. | |
| 7,341,800 B2 | 3/2008 | Sasahara et al. | |
| 7,378,176 B2 | 5/2008 | McLean et al. | |
| 7,410,720 B2 | 8/2008 | Yoshitake et al. | |
| 7,604,887 B2 | 10/2009 | Mino et al. | |
| 7,632,587 B2 | 12/2009 | McLean et al. | |
| RE41,163 E | 3/2010 | McLean et al. | |
| 7,858,262 B2 | 12/2010 | Faucheux et al. | |
| 8,232,025 B2 | 7/2012 | McLean et al. | |
| 2003/0077496 A1 | 4/2003 | Keegan et al. | |
| 2003/0082425 A1 | 5/2003 | Leban | |
| 2003/0104273 A1 | 6/2003 | Lee et al. | |
| 2003/0152817 A1 | 8/2003 | Sato et al. | |
| 2003/0162076 A1 | 8/2003 | Kubota | |
| 2003/0175569 A1 | 9/2003 | Inagaki et al. | |
| 2003/0194598 A1 | 10/2003 | Chan | |
| 2003/0215719 A1* | 11/2003 | Navarrini et al. | 429/316 |
| 2004/0062965 A1 | 4/2004 | Morse et al. | |
| 2004/0071865 A1 | 4/2004 | Mosdale et al. | |
| 2004/0175626 A1 | 9/2004 | Dasgupta et al. | |
| 2004/0209136 A1 | 10/2004 | Ren et al. | |
| 2004/0224190 A1 | 11/2004 | Sasahara et al. | |
| 2005/0249994 A1 | 11/2005 | McLean et al. | |
| 2005/0250004 A1 | 11/2005 | McLean et al. | |
| 2005/0260478 A1 | 11/2005 | Mino et al. | |
| 2006/0127734 A1 | 6/2006 | McLean et al. | |
| 2007/0134531 A1 | 6/2007 | Kimura et al. | |
| 2007/0166590 A1 | 7/2007 | Nakano | |
| 2007/0184330 A1 | 8/2007 | McLean et al. | |
| 2008/0233446 A1 | 9/2008 | Zimmermann et al. | |
| 2008/0233454 A1 | 9/2008 | Capron et al. | |
| 2008/0248352 A1 | 10/2008 | McLean et al. | |
| 2009/0081493 A1 | 3/2009 | Schrooten et al. | |
| 2010/0183955 A1 | 7/2010 | McLean et al. | |
| 2011/0003229 A1 | 1/2011 | Schrooten | |
| 2012/0270132 A1 | 10/2012 | McLean et al. | |

FOREIGN PATENT DOCUMENTS

| | | |
|---|---|---|
| CA | 2408588 | 12/2001 |
| CA | 2408588AA | 12/2001 |
| CA | 2408538 | 11/2002 |
| CA | 2408538AA | 11/2002 |
| CA | 2473491 A1 | 8/2003 |
| CA | 2479000 A1 | 9/2003 |
| CA | 1461070 A | 12/2003 |
| CA | 2446121 | 4/2004 |
| CA | 2446121AA | 4/2004 |
| EP | 0763070 B1 | 3/1997 |
| EP | 1202365 A1 | 5/2002 |
| EP | 1294039 A1 | 3/2003 |
| EP | 1345280 A1 | 9/2003 |
| GB | 1091303 A | 11/1967 |
| JP | 2001-514431 A | 9/2001 |
| JP | 2003-123792 A | 4/2003 |
| JP | 2005190752 | 7/2005 |
| JP | 2005190752 A | 7/2005 |
| JP | 2006127852 | 5/2006 |
| JP | 2006127852 A | 5/2006 |
| JP | 2008041371 | 2/2008 |
| JP | 2008041371 A | 2/2008 |
| KR | 10-1997-0703384 | 7/1997 |
| KR | 10-2004-0033038 | 4/2004 |
| WO | WO-95/32235 A1 | 11/1995 |
| WO | WO-97/41168 A1 | 11/1997 |
| WO | WO-99/10165 A1 | 3/1999 |
| WO | WO-99/67447 A1 | 12/1999 |
| WO | WO-2004/019439 A1 | 3/2004 |
| WO | WO-2007020242 A1 | 2/2007 |
| WO | WO-2007079580 A1 | 7/2007 |
| WO | WO-2009039656 A1 | 4/2009 |
| WO | WO-2009105896 A1 | 9/2009 |

OTHER PUBLICATIONS

"European Application No. 05741083.9, Supplementary European Search Report mailed Mar. 2, 2009", 4 pgs.

"International Patent Application Serial No. PCT/CA2005/000663, International Search Report mailed Aug. 30, 2005", 2 pgs.

"International Patent Application Serial No. PCT/CA2005/000663, Written Opinion mailed Aug. 30, 2005", 6 pgs.

"U.S. Appl. No. 11/047,558, Amendment and Response filed Nov. 15, 2006 to Final Office Action mailed Jun. 16, 2006", 14 pgs.

"U.S. Appl. No. 11/047,558, Examiner's Interview Summary mailed Oct. 17, 2006", 2 pgs.

"U.S. Appl. No. 11/047,558, Notice of Non-Compliant Amendment mailed Jun. 28, 2007", 2 pgs.

"U.S. Appl. No. 11/047,558, Amendment and Response filed Mar. 28, 2006 to Non-Final Office Action mailed Nov. 28, 2005", 12 pgs.

"U.S. Appl. No. 11/047,558, Final Office Action mailed Jun. 16, 2006", 15 pgs.

"U.S. Appl. No. 11/047,558, Non-Final Office Action mailed Jan. 22, 2007", 6 pgs.

"U.S. Appl. No. 11/047,558, Non-Final Office Action mailed Nov. 28, 2005", 14 pgs.

"U.S. Appl. No. 11/047,558, Notice of Allowance mailed Oct. 3, 2007", 3 pgs.

"U.S. Appl. No. 11/047,558, Amendment and Response filed Apr. 20, 2007 to Non-Final Office Action mailed Jan. 22, 2007", 11 pgs.

"U.S. Appl. No. 11/047,558, Amendment and Response filed Jul. 27, 2007 to Non-Final Office Action mailed Jan. 22, 2007", 11 pgs.

"U.S. Appl. No. 11/047,558 Notice of Allowance mailed Jan. 24, 2008", 4 pgs.

"U.S. Appl. No. 11/290,646, Amendment and Response filed Nov. 15, 2006 to Non-Final Office Action mailed Jun. 15, 2006", 8 pgs.

"U.S. Appl. No. 11/290,646, Examiner Interview Summary Record mailed Oct. 17, 2006", 2 pgs.

"U.S. Appl. No. 11/290,646, Non-Final Office Action mailed Jun. 15, 2006", 13 pgs.

"U.S. Appl. No. 11/290,646, Notice of Allowance mailed Feb. 22, 2007", 4 pgs.

"U.S. Appl. No. 11/290,647, Amendment and Response filed Nov. 15, 2006 to Non-Final Office mailed Jun. 15, 2006", 9 pgs.

"U.S. Appl. No. 11/290,647, Examiner's Interview Summary Record mailed Oct. 17, 2006", 2 pgs.

"U.S. Appl. No. 11/290,647, Non-Final Office mailed Jun. 15, 2006", 9 pgs.

"U.S. Appl. No. 11/290,647, Notice of Allowance Jan. 26, 2007", 4 pgs.

"U.S. Appl. No. 11/047,558, Amendment and Response filed Nov. 15, 2006 to Finail Office Action mailed Jun. 16, 2006", 14 pgs.

"U.S. Appl. No. 11/047,558, Interview Summary dated Oct. 17, 2006", 2 pgs.

"U.S. Appl. No. 11/047,558, Response filed Sep. 20, 2005 to Restriction Requirement mailed Aug. 23, 2005", 1 pg.

"U.S. Appl. No. 11/047,558, Restriction Requirement mailed Aug. 23, 2005", 6 pgs.

"U.S. Appl. No. 11/047,560, Non-Final Office Action mailed Dec. 24, 2008", 12 pgs.

"U.S. Appl. No. 11/047,560, Amendment and Response filed Mar. 2, 2007 to Non-Final Office Action mailed Nov. 2, 2006", 15 pgs.

"U.S. Appl. No. 11/047,560, Amendment and Response filed Mar. 24, 2009 to Non Final Office Action mailed Dec. 24, 2008", 11 pgs.

"U.S. Appl. No. 11/047,560, Amendment and Response filed Aug. 3, 2006 to Non-Final Office Action mailed May 3, 2006", 15 pgs.

"U.S. Appl. No. 11/047,560, Amendment and Response filed Sep. 17, 2007 to Non-Final Action mailed Jun. 15, 2007", 6 pgs.

"U.S. Appl. No. 11/047,560, Internview Summary mailed Feb. 23, 2007", 2 pgs.

"U.S. Appl. No. 11/047,560, Internview Summary mailed Oct. 17, 2006", 2 pgs.

"U.S. Appl. No. 11/047,560, Non-Final Office Action mailed May 3, 2006", 12 pgs.

"U.S. Appl. No. 11/047,560, Non-Final Office Action mailed Jun. 15, 2007", 12 pgs.

"U.S. Appl. No. 11/047,560, Non-Final Office Action mailed Nov. 2, 2006", 15 pgs.

"U.S. Appl. No. 11/047,560, Notice of Allowance mailed Jul. 28, 2009", 4 pgs.

"U.S. Appl. No. 11/047,560, Notice of Allowance mailed Sep. 26, 2008", 4 pgs.

"U.S. Appl. No. 11/047,560, Response filed Feb. 8, 2006 to Restriction Requirement mailed Jan. 9, 2006", 2 pgs.

"U.S. Appl. No. 11/047,560, Response filed Nov. 8, 2005 to Restriction Requirement mailed Aug. 23, 2005", 2 pgs.

"U.S. Appl. No. 11/047,560, Restriction Requirement mailed Jan. 9, 2006", 5 pgs.

"U.S. Appl. No. 11/047,560, Restriction Requirement mailed Aug. 23, 2005", 5 pgs.

."U.S. Appl. No. 12/637,422, Non Final Office Action mailed Feb. 2, 2011", 10 pgs.

"Chinese Application Serial No. 200580018092.5, Response flied Apr. 15, 2009 to Office Action mailed Feb. 6, 2009", 8 pgs.

"Chinese Application Serial No. 200580018092.5, Response filed Nov. 4, 2009 to Third Office Action dated Jun. 19, 2009", (w/ English Translation of Amended Claims), 14 pgs.

"Chinese Application Serial No. 200580018092.5, Fourth Office Action mailed Dec. 4, 2009", (w/ English Translation), 21 pgs.

"Chinese Application Serial No. 200580018092.5, Response filed Apr. 14, 2010 to Fourth Office Action mailed Dec. 4, 2009", 7 pgs.

"Chinese Application Serial No, 200580018092.5, Third Office Action dated Jun. 19, 2009", (w/ English Translation), 33 pgs.

"Chinese Application Serial No. 200580018178.8 , Office Action mailed May 8, 2009", 8 pgs.

"Chinese Application Serial No. 200580018178.8, Response filed Nov. 23, 2009 to Office Action dated May 8, 2009", 7 pgs.

"Chinese Application Serial No. 200580018178.8, Second Office Action mailed Jun. 11, 2010", 10 pgs.

"European Application No. 05741083.9, Office Action mailed Mar. 19, 2010", 9 pgs.

"European Application No. 05741083.9, Response filed Sep. 29, 2010 to Office Action mailed Mar. 19, 2010", 16 pgs.

"European Application Serial No. 05741066.4, Office Action mailed Feb. 5, 2009", 4 pgs.

"European Application Serial No. 05741066.4, Response filed Jun. 12, 2009 to Communication dated Feb. 5, 2009", 25 pgs.

"International Application Serial No. PCT/CA2005/000669, International Search Report mailed Aug. 18, 2005", 2 pgs.

"International Application Serial No. PCT/CA2005/000669, Written Opinion mailed Aug. 18, 2005", 5 pgs.

"International Application Serial No. PCT/CA2008/001713, International Search Report mailed Jan. 5, 2009", 3 pgs.

"International Application Serial No. PCT/CA2008/001713, Written Opinion mailed Jan. 5, 2009", 4 pgs.

"International Application Serial No. PCT/CA2009/000253, International Search Report mailed Jun. 12, 2009", 4 pgs.

"International Application Serial No. PCT/CA2009/000253, Written Opinion mailed Jun. 12, 2009", 7 pgs.

McLean, G. F., "Flexible Fuel Cell", U.S. Appl. No. 60/975,132, filed Sep. 25, 2007, 20 pgs.

Schrooten, J., et al., "Electrochemical Cell and Membranes Related Thereto", U.S. Appl. No. 61/025,739, filed Feb. 1, 2008, 27 pgs.

Schrooten, J., et al., "Fluid Manifold and Method Therefor", U.S. Appl. No. 12/053,366, filed Mar. 21, 2008, 37 pgs.

Schrooten, J., et al., "Fuel Cell Systems Including Space-Saving Fluid Plenum and Related Methods", U.S. Appl. No. 12/238,241, filed Sep. 25, 2008, 36 pgs.

"U.S. Appl. No. 12/238,241, Response filed Aug. 19, 2011 to Restriction Requirement mailed Jul. 19, 2011", 6 pgs.

"U.S. Appl. No. 12/238,241, Restriction Requirement mailed Jul. 19, 2011", 6 pgs.

"U.S. Appl. No. 12/637,422, Response filed Aug. 2, 2011 to Non Final Office Action mailed Feb. 2, 2011", 12 pgs.

"European Application Serial No. 057410839, Office Action dated Aug. 12, 2011", 5 pages.

"Singaporean Serial No. 201006260-2, Amendment filed Mar. 18, 2011", 6pgs.

"Singaporean Application Serial No. 201006260-2, Examination Report mailed Oct. 6, 2011", 8 pgs.

"Japanese Application Serial No. 2005-511797, Office Action mailed Nov. 29, 2011", (w/ English Translation), 7 pgs.

"Korean Application Serial No. 2006-7023189, Office Action mailed Nov. 7, 2011", (English Translation), 6 pgs.

"U.S. Appl. No. 12/238,241, Non Final Office Action mailed Nov. 25, 2011", 11 pgs.

"Canadian Application Serial No. 2,565,244, Examiner's Report mailed Jun. 8, 2011", 3 pgs.

"Canadian Application Serial No. 2,565,244, Reponse filed Nov. 22, 2011 to Examiner's Report mailed Jun. 8, 2011", 7 pgs.

"U.S. Appl. No. 12/238,241, Non Final Office Action mailed Dec. 17, 2012", 17 pgs.

"U.S. Appl. No. 12/238,241, Response filed Aug. 10, 2012 to Final Office Action mailed Apr. 10, 2012", 8 pgs.

"U.S. Appl. No. 12/920,064, Restriction Requirement mailed Jan. 23, 2013", 7 pgs.

"U.S. Appl. No. 13/535,880, Response filed Jan. 15, 2013 to Restriction Requirement mailed Nov. 26, 2012", 7 pgs.

"U.S. Appl. No. 13/535,880, Restriction Requirement mailed Nov. 26, 2012", 6 pgs.

"Chinese Application Serial No. 200980110830.7, Office Action mailed Dec. 20, 2012", 5 pgs.

"European Application Serial No. 09714121.2, European Search Report mailed Aug. 3, 2012", 9 pgs.

"European Application Serial No. 12161876.3, Extended European Search Report mailed Jul. 13, 2012", 13 pgs.

"European Application Serial No. 12161876.3, Response filed Feb. 15, 2013 to Extended European Search Report mailed Jul. 13, 2012", 16 pgs.

"Indian Application Serial No. 1294/MUMNP/2006, Hearing Notice dated Oct. 18, 2012", 2 pgs.

"Indian Application Serial No. 1294/MUMNP/2006, Written Submission filed Nov. 15, 2012 in Response to Hearing Notice dated Oct. 18, 2012", 22 pgs.

"International Application Serial No. PCT/CA2005/000663, International Preliminary Report on Patentability dated Nov. 7, 2006", 7 pgs.

"International Application Serial No. PCT/CA2009/000253, International Preliminary Report on Patentability dated Aug. 31, 2010", 8 pgs.

"Japanese Application Serial No. 2010-547930 , Response filed Apr. 18, 2012 to Office Action mailed Apr. 12, 2012", 2 pgs.

"Japanese Application Serial No. 2010-547930 , Voluntary Amendment filed Feb. 24, 2012", (w/ English Translation of Claims), 17 pgs.

"Korean Application Serial No. 10-2010-7021778, Amendment filed Feb. 28, 2012", 14 pgs.

"U.S. Appl. No. 12/238,241, Final Office Action mailed Apr. 10, 2012", 14 pgs.

"U.S. Appl. No. 12/238,241, Response filed Feb. 24, 2012 to Non Final Office Action mailed Nov. 25, 2011", 14 pgs.

"U.S. Appl. No. 12/637,422, Notice of Allowance mailed Jan. 24, 2012", 9 pgs.

"U.S. Appl. No. 12/637,422, Notice of Allowance mailed Apr. 2, 2012", 9 pgs.

"European Application Serial No. 05741083.9, Response filed Dec. 15, 2011 to Office Action mailed Aug. 12, 2011", 18 pgs.

"India Application Serial No. 1294/MUMNP/2006, First Examination Report mailed Jan. 18, 2012", 1 pg.

"Japanese Application Serial No. 2007-511797, Response filed Feb. 29, 2012 to Office Action mailed Dec. 22, 2011", (w/ English Translation of Amended Claims), 15 pgs.

"Korean Application Serial No. 2006-7023189, Response filed Feb. 7, 2012 to Office Action mailed Nov. 7, 2011", 27 pgs.

"Machine Translation of JP 2003-123792A, dated Apr. 25, 2003", 21 pgs.

U.S. Appl. No. 12/238,241, filed Sep. 25, 2008, Fuel Cell Systems Including Space-Saving Fluid Plenum and Related Methods.

U.S. Appl. No. 13/535,880, filed Jun. 28, 2012, Electrochemical Cells Having Current-Carrying Structures Underlying Electrochemical Reaction Layers.

U.S. Appl. No. 12/920,064, filed Aug. 27, 2010, Electrochemical Cell and Membranes Related Thereof.

"U.S. Appl. No. 12/920,064, Response filed Feb. 21, 2013 to Restriction Requirement mailed Jan. 23, 2013", 8 pgs.

"U.S. Appl. No. 13/535,880, Non Final Office Action mailed Mar. 14, 2013", 10 pgs.

"European Application Serial No. 09714121.2, Response filed Feb. 27, 2013 to Extended European Search Report mailed Aug. 3, 2012", 18 pgs.

\* cited by examiner

MEMBRANES AND ELECTROCHEMICAL CELLS INCORPORATING SUCH MEMBRANES

RELATED APPLICATIONS

This application is a continuation under 37 C.F.R. 1.53(b) of U.S. application Ser. No. 11/047,558 filed Feb. 2, 2005, now U.S. Pat. No. 7,378,176 which claims the benefit of U.S. Provisional Application Ser. No. 60/567,437 filed May 4, 2004, which applications are incorporated by reference herein.

The subject matter of this application is also related to co-owned U.S. application Ser. No. 11/290,646 filed Dec. 1, 2005, and U.S. application Ser. No. 11/290,647 filed Dec. 1, 2005, which are incorporated herein by reference.

FIELD OF THE INVENTION

This invention relates to electrochemical cells, such as fuel cells, electrolysis cells and the like which incorporate ion-conducting membranes. Particular embodiments of the invention provide ion-conducting membranes for use in such cells.

BACKGROUND

Ion-conducting membranes, including ionomeric membranes such as Nafion™, are an important component in membrane separation processes and electrochemical reactor systems including chlor-alkali cells, electrolysis cells and fuel cells. Such membranes act as ion conductors while preventing reactants from inter-mixing. In some applications, the ions conducted by such membranes are protons. The availability of materials which are solid and can conduct protons has allowed a breakthrough in the production of simple and robust fuel cell devices.

In typical prior art fuel cells, the ion-conducting membrane is an ionomeric membrane that fulfills several functions including providing ion conductivity, providing a barrier between reactants and providing a structural spacer that withstands the clamping forces necessary to seal the fuel cell.

The design of ion-conducting membranes for use in electrochemical cells typically requires balancing between two competing design objectives. Firstly, it is generally desirable to maximize the conductivity of the ion-conducting membrane to minimize operational losses. This first objective tends to favor ion-conducting materials which have high water contents and therefore approach liquid form. Secondly, it is generally desirable to provide a membrane that is robust and usable as a structural material within the cell to maintain integrity of the cell in the presence of differential pressures across the membrane. This second objective tends to favor ion-conducting materials which are solid and have high strength. It will be appreciated that these two design objectives often conflict with one another. Current practices for designing electrochemical cells involve making compromises between these design objectives.

An example of an ion-conducting material is Nafion™, which is typically provided in the form of sheets that may be as thin as 25 microns. FIG. 1 is a schematic cross-sectional view of a Nafion™ membrane 8. Membrane 8 is a continuous sheet of ion-conducting material. Nafion™ membranes are susceptible to mechanical failure and are difficult to work with, especially if they are very thin. Another problem with materials like Nafion™ is that they are not dimensionally stable when used to conduct protons. Variations in water content of the membrane, which are inevitable during proton conduction, cause considerable shrinking and swelling. Electrochemical cells incorporating Nafion™ membranes must be designed to accommodate such shrinking and swelling.

Gore-Select™ is a composite perfluorinated material consisting of a homogeneously porous substrate filled with an ion-conducting material. U.S. Pat. No. 6,613,203 describes a membrane of this type. FIG. 2 schematically depicts a Gore-Select™ membrane 10 having a homogeneous substrate 12 filled with an ion-conducting material 14. Porous substrate 12 provides membrane 10 with some degree of structural integrity and dimensional stability, while ion-conducting filler 14 provides proton conductivity.

There remains a need for ion-conducting membranes for use in electrochemical applications, such as fuel cells, electrolysis cells, chlor-alkali plants and the like, which possess advantageous mechanical properties and desirably high ion conductivity.

SUMMARY OF THE INVENTION

A first aspect of the invention provides an ion-conducting membrane comprising an ion-conducting region. The ion-conducting region comprises a substrate having one or more ion-conducting passageways that extend through the substrate. Each passageway comprises an ion-conducting material that is relatively more ion conductive than the substrate.

Another aspect of the invention provides an ion-conducting membrane which comprises: a substrate penetrated by a plurality of openings in a porous region thereof; and an ion-conducting material which fills the openings to provide a plurality of ion-conducting passageways through the substrate. The ion-conducting material is relatively more ion conductive than the substrate.

Another aspect of the invention provides an ion-conducting membrane, which comprises: a substrate penetrated by at least one opening; and an ion-conducting material which fills the at least one opening to provide an ion-conducting passageway through the substrate and which provides a first skin layer on a first side of the substrate, the skin layer extending transversely past a perimeter of the opening. The ion-conducting material is relatively more ion-conductive than the substrate.

Another aspect of the invention provides an ion-conducting membrane comprising an ion-conducting region. The ion-conducting region comprises a substrate having one or more ion-conducting passageways that extend through the substrate. The ion-conducting passageways are formed by selectively converting the substrate to a relatively more ion conductive state in locations corresponding to the ion-conducting passageways.

Another aspect of the invention provides an electrochemical cell comprising an ion-conducting membrane in accordance with the invention.

Another aspect of the invention provides a method for fabricating an ion-conducting membrane for use in an electrochemical cell. The method comprises: forming a plurality of openings which penetrate a sheet of substrate material at selected locations to create a porous region; and, filling the openings with an ion-conducting material to create a plurality of ion-conducting passageways through the substrate material.

Another aspect of the invention provides a method for fabricating an ion-conducting membrane for use in an electrochemical cell. The method comprises selectively converting a sheet of substrate material to a relatively more ion conductive state in a plurality of locations to create a plurality of ion-conducting passageways through the sheet and to create an ion-conducting region in the sheet.

Another aspect of the invention provides a method for fabricating an ion-conducting membrane for use in an electrochemical cell. The method comprises: forming at least one opening which penetrates a sheet of substrate material; and, filling the at least one opening with an ion-conducting material to create an ion-conducting passageway through the substrate material; and forming a first skin layer on a first side of the substrate, the skin layer extending transversely past a perimeter of the opening.

Further features and applications of specific embodiments of the invention are described below.

BRIEF DESCRIPTION OF THE DRAWINGS

In drawings which illustrate non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Membranes suitable for use in electrochemical cells may be fabricated by providing a sheet of substrate material and forming one or more ion-conducting passageways through the sheet of substrate material. The ion-conducting passageway(s) have an ion conductivity greater than that of the surrounding substrate material. Ion-conducting passageway(s) may be formed by creating opening(s) which penetrate the substrate material and then filling the opening(s) with ion-conducting material and/or by selectively converting the substrate material to a relatively more ion conductive state in location(s) of the ion-conducting passageway(s). Mechanical and ion-conducting properties of the membranes can be made different in different regions by providing the ion-conducting passageway(s) with varying sizes, shapes, densities and/or arrangements.

Figure 1:
FIG. 1 is a cross-sectional schematic view of a sheet of ion-conducting material of the type commonly employed in prior art fuel cells.
Figure 2:
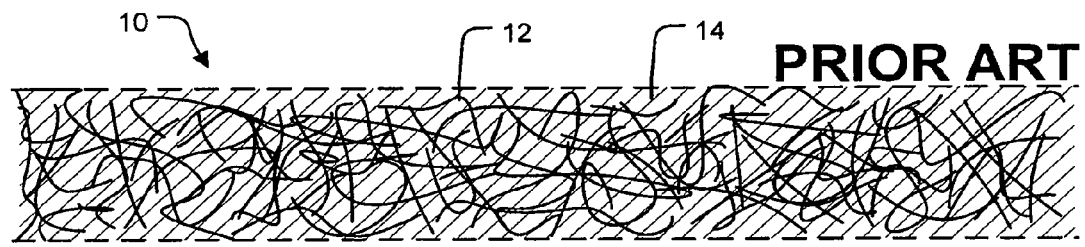
FIG. 2 is a cross-sectional schematic view of a prior art composite membrane having a homogeneously porous substrate filled with ion-conducting material.
Figure 3A:
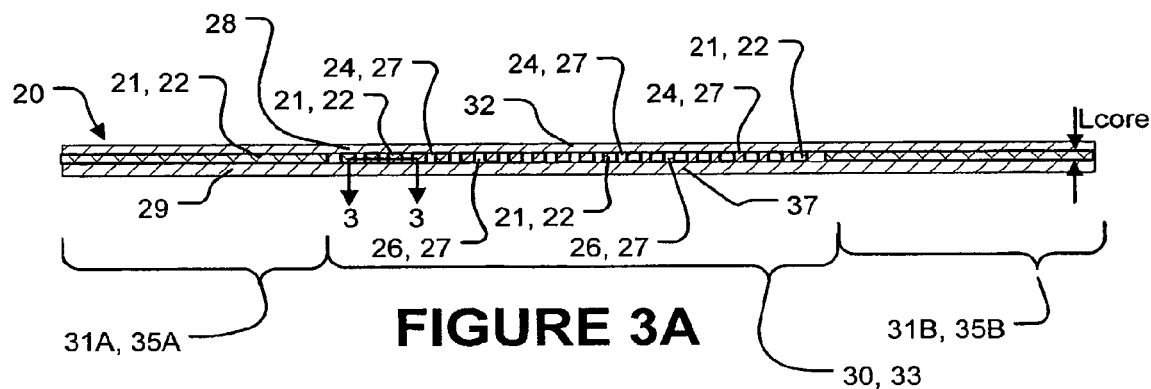
FIG. 3A is a cross-sectional schematic view of an ion-conducting membrane according to a particular embodiment of the invention.

FIG. 3A is a schematic cross-sectional depiction of an ion-conducting membrane 20 according to a particular embodiment of the invention. Membrane 20 comprises one or more ion-conducting regions 33 and one or more non-ion-conducting regions 35A, 35B (collectively 35). FIG. 3A shows a membrane 20 having one ion-conducting region 33 bordered by a pair of non-ion-conducting regions 35A, 35B. Membrane 20 comprises a substrate 21 of substrate material 22 and optionally comprises first and/or second skins 28, 29 on respective sides 32, 37 of substrate 21.

Ion-conducting region 33 of membrane 20 comprises ion-conducting passageways 27 that extend from a first side 32 of substrate 21 to a second side 37 of substrate 21. Ion-conducting passageways 27 comprise an ion-conducting material 26 having an ion conductivity greater than that of the surrounding material (i.e. the material outside of ion-conducting passageways 27). In some embodiments, ion-conducting material 26 is an ionomeric material. Optional skins 28, 29 may also comprise ion-conducting material 26.

Ion-conducting passageway(s) 27 may be formed by creating opening(s) 24 which penetrate a substrate material 22 and then filling the opening(s) 24 with ion-conducting material 26 and/or by selectively converting substrate material 22 to a relatively more ion conductive state in location(s) of ion-conducting passageway(s). Both of these fabrication techniques are discussed in more detail below.

In accordance with one embodiment of the invention, membrane 20 comprises a substrate 21 made of a substrate material 22. Openings 24 are formed to penetrate substrate 21 at selected locations. Openings 24 may be micro-structures. In this disclosure, a "micro-structure" is a structure capable of being revealed by a microscope having a magnification of 5 times or more. Openings 24 need not be micro-structures. In some embodiments, openings 24 are larger.

Openings 24 provide substrate 21 with one or more porous regions 30 which are relatively more porous than surrounding regions 31A, 31B. Each porous region 30 of substrate 21 comprises a plurality of openings 24 and corresponds with an ion-conducting region 33 of membrane 20. Non-porous regions 31A, 31B (collectively, 31) respectively correspond to non-ion-conducting regions 35A, 35B of membrane 20. In the FIG. 3A embodiment, there are no openings 24 formed in non-porous regions 31A, 31B of substrate 21.

Substrate material 22 may comprise any suitable material or combination of materials that provides a substantial barrier to the reactants with which membrane 20 will be used. For example, a membrane for use in a hydrogen/air fuel cell is preferably substantially impermeable to hydrogen and oxygen gases. Substrate material 22 may comprise, for example, a material selected from:
- polyamide films,
- polyimide films, such as Kapton™,
- polyethylene films,
- Teflon™ films,
- films comprising other polymers,
- a resin precursor to hydrolyzed Nafion™,
- non-polymer materials such as silicon or glass.

Substrate material 22 is selected to be suitable for the desired application. In some embodiments, it is advantageous for substrate material 22 to be flexible to some degree.

In porous region(s) 30 of substrate 21, openings 24 are filled with an ion-conducting material 26 to form ion-conducting passageways 27 that extend through membrane 20 from a first side 32 of substrate 21 to a second side 37 of substrate 21. Ion-conducting material 26 is relatively more ion-conductive than the surrounding substrate material 22. In the illustrated embodiment, passageways 27 each have a path length equal to the thickness $L_{core}$ of substrate 21. In other words, passageways 27 have tortuosity factors of 1, where tortuosity is equal to the distance that a particle must travel to pass through substrate 21 divided the thickness ($L_{core}$) of substrate 21.

Openings 24 may be formed in substrate 21 using any suitable method. By way of non-limiting example, openings 24 may be formed through substrate 21 by:
- chemical etching;
- laser micromachining;
- laser drilling;
- mechanical drilling;
- milling;
- punching;
- calendaring;
- printed circuit board fabrication techniques;
- lithographic fabrication techniques;
- mechanical dies; and
- the like.

As noted above, passageways may also be formed without forming and filling openings 24 by selectively converting the material of substrate 21 from one state to another, for example by selectively hydrolyzing a Nafion™ precursor resin.

The dimensions of passageways 27, the spacing between passageways 27, the shapes of passageways 27 and the arrangement of passageways 27 can be selected to suit particular applications and may be influenced by cost factors. In one particular example, passageways 27 are formed in the shape of slits in openings 24 made using conventional sheet conversion methods. Passageways 27 may be round or may have other shapes, such as cross shapes, hexagonal shapes, oval-shapes, elliptical shapes or star shapes.

In preferred embodiments, passageways 27 are formed in ordered arrangements, as opposed to placed at random locations. Any suitable patterns may be used. For example, passageways 27 may be located at nodes of:
- a square or rectangular array;
- a triangular array;
- a hexagonal array; or,
- any other suitable arrangement.

Figure 3B:
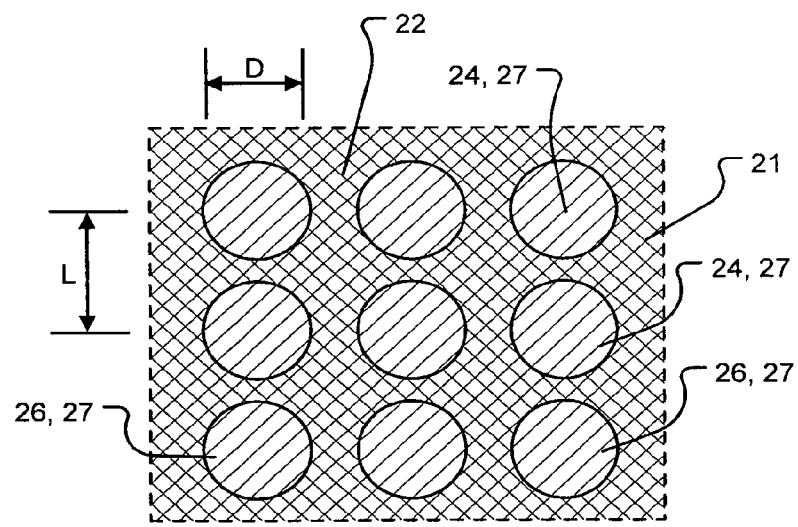
FIG. 3B is a partial transverse cross-sectional view of the ion-conducting region of the FIG. 3A membrane taken along the line 3-3 (see FIG. 3A) in accordance with a particular embodiment of the invention.

FIG. 3B is a partial cross-sectional view of ion-conducting region 33 of membrane 20 along the line 3-3 (see FIG. 3A) in accordance with a particular embodiment of the invention. In this embodiment, ion-conducting passageways 27 are circular in transverse cross-section and are arranged in a rectangular array.

The parameter D is used to denote the widest transverse dimension of ion-conducting passageways 27. In the FIG. 3B embodiment, passageways 27 are all the same size and the parameter D is equal to the diameter of the openings 24 in which passageways 27 are formed. The parameter L denotes the center-to-center transverse spacing of the nearest adjacent ion-conducting passageways 27.

Figure 3C:
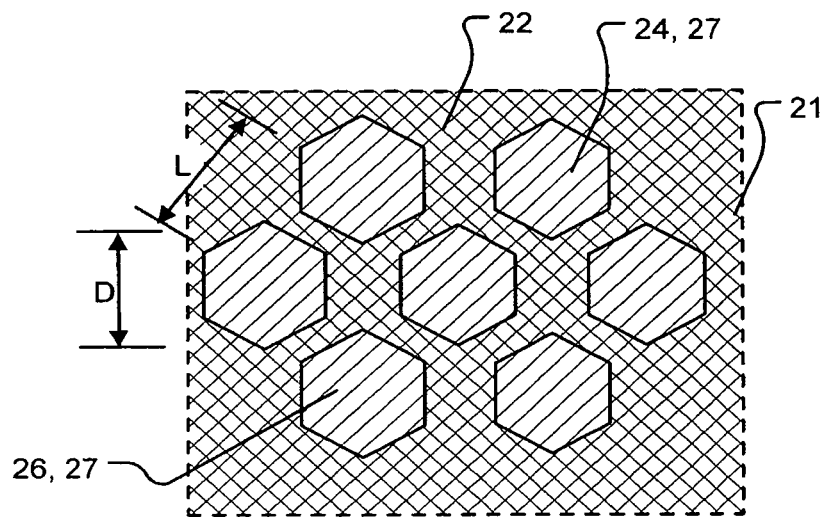
FIG. 3C is a partial transverse cross-sectional view of the ion-conducting region of the FIG. 3A membrane taken along the line 3-3 (see FIG. 3A) in accordance with another embodiment of the invention.

FIG. 3C depicts a partial cross-sectional view of ion-conducting region 33 of membrane 20 along the line 3-3 (see FIG. 3A) according to another embodiment of the invention. In the FIG. 3C embodiment, ion-conducting passageways 27 are hexagonal in transverse cross-section and are arranged in a hexagonal packing array. The parameters D (i.e. the widest dimension of passageways 27) and L (i.e. the center-to-center spacing between nearest adjacent passageways 27) are also illustrated in FIG. 3C.

In some embodiments, the parameter D of passageways 27 is 200 microns or less. In other embodiments, the parameter D of passageways 27 is 2500 microns or less. In some embodiments, passageways 27 have cross-sectional areas not exceeding $5 \times 10^{-8}$ m$^2$. In other embodiments, passageways 27 have cross-sectional areas not exceeding $1 \times 10^{-5}$ m$^2$. In some embodiments, ion-conducting passageways 27 have a minimum transverse dimension of at least 25 microns. In other embodiments, ion-conducting passageways 27 have a minimum transverse dimension of at least 50 microns. In some embodiments, the parameter L of passageways 27 is 500 microns or less in at least some areas of porous region 30. In other embodiments, the parameter L of passageways 27 is 5000 microns or less in at least some areas of porous region 30.

For maximum conductivity through membrane 20, it is desirable for the parameter ratio L/D to be as close to unity as possible. In some embodiments, membranes according to the invention are constructed having a parameter ratio L/D not exceeding 2.5 in one or more ion-conducting regions. In other embodiments, membranes according to the invention are constructed having a parameter ratio L/D not exceeding 1.5.

Another ratio parameter γ may be used to characterize conducting regions of membranes according to the invention. The ratio parameter γ may be defined as the ratio of the total transverse area of an ion-conducting region to the total transverse area of the ion-conducting passageways 27 within the ion-conducting region. In some embodiments, membranes according to the invention are constructed having a parameter ratio γ not exceeding 2.5 in one or more ion-conducting regions. In other embodiments, membranes according to the invention are constructed having a parameter ratio γ not exceeding 1.5.

Substrate 21 provides structural support for ion-conducting material 26 and overall structural support for membrane 20 (see FIG. 3A). The mechanical properties of substrate 21 can be selected to match the mechanical properties desired for particular applications. For example, by varying the density, size, shape and/or arrangement of openings 24 in different regions of substrate 21, one can provide different mechanical properties and/or different ion-conducting properties in those different regions.

Figure 4:
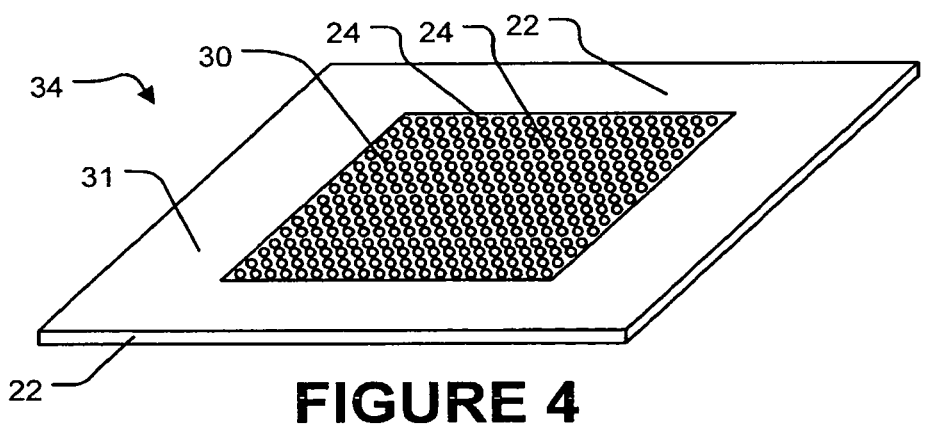
FIG. 4 is a perspective view of a sheet of substrate material which may be used in a membrane of the type shown in FIG. 3A according to a particular embodiment of the invention.

FIG. 4 shows a planar sheet 34 of substrate material 22 according to a particular embodiment of the invention. Sheet 34 may be used as a substrate 21 of an ion-conducting membrane 20 of the type shown in FIG. 3A for use in an electrochemical cell, such as a fuel cell. In the FIG. 4 embodiment, sheet 34 is fabricated from a thin sheet of substrate material 22 and is divided into perimeter (non-porous) seal region 31, which surrounds porous region 30. Porous region 30 has openings 24 which penetrate sheet 34. When a fuel cell having an ion-conducting membrane 20 is constructed using sheet 34 as a substrate 21, ions may be conducted through openings 24 of porous region 30, while perimeter seal region 31 provides structural strength in the vicinity of the fuel cell's compressive seals.

It is not necessary that porous region 30 be uniformly porous. In some cases, it is advantageous to vary characteristics of openings 24 (e.g. size, shape, density and/or arrangement of openings 24) and/or the parameters associated with openings 24 (e.g. L, D, L/D and/or γ) across a porous region, such as region 30. In some cases, it is advantageous to provide a substrate 21 with a plurality of porous regions. The characteristics of openings 24 and parameters associated with openings 24 may be different in each such porous region.

In regions expected to be subjected to relatively high local mechanical stresses, openings 24 may be made relatively small and/or the density of openings 24 may be made relatively low. In regions expected to be subjected to relatively high local mechanical stresses, the parameter ratio L/D and/or the parameter γ may be made relatively large. For example, in such regions, the parameter ratio L/D and/or the parameter γ may be greater than 5. Although such regions may have relatively low proton conductivity, they may provide relatively high mechanical strength.

In regions expected to be subjected to relatively low mechanical stresses, openings 24 may be made relatively large and/or the density of openings 24 may be made relatively high. In regions expected to be subjected to relatively low mechanical stresses, the parameter ratio L/D and/or the parameter γ may be made relatively low. For example, in such regions, the parameter ratio L/D and/or the parameter γ may be less than 3. Such regions may provide relatively high proton conductivity at the expense of mechanical strength. Using these techniques, it is possible tune the performance (i.e. mechanical strength and proton conductivity) over the spatial dimensions of a fuel cell membrane.

Figure 5:
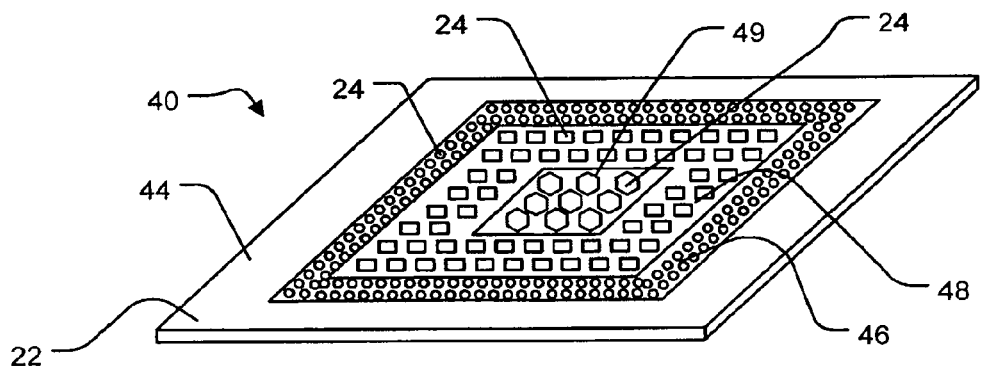
FIG. 5 is a perspective view of a sheet of substrate material which may be used in a membrane of the type shown in FIG. 3A according to another embodiment of the invention.

FIG. 5 shows a planar sheet 40 of substrate material 22 according to another example embodiment of the invention. Sheet 40 may be used as a substrate 21 of an ion-conducting membrane 20 of the type shown in FIG. 3A for use in a fuel cell. Sheet 40 is formed from a substrate material 22 and comprises: a non-porous perimeter region 44, a first porous region 46, a second porous region 48, and a third porous region 49. Porous regions 46, 48, and 49 each have openings 24. The characteristics of openings 24 and/or the parameters associated with openings 24 in porous regions 46, 48, 49 differ from one another. For example, the size of their openings 24, the density of openings 24, the shape of openings 24 and/or the arrangement or openings 24 vary between porous regions 46, 48, 49. In the FIG. 5 embodiment, the size and shape of openings 24 varies between porous regions 46, 48, 49.

In other embodiments (not shown), the characteristics of openings 24 (e.g. density, size, shape and/or arrangement) and/or the parameters of openings 24 (e.g. L, D, L/D and/or γ) vary smoothly over a porous region of a substrate. For example, the parameter ratio L/D and/or the parameter γ of openings 25 may vary in accordance with a smooth function such as a bell curve. In still other embodiments (not shown), a sheet of substrate material 22 may be fabricated to have openings 24 of uniform characteristics and/or parameters over the entire sheet of substrate material 22. Openings 24 are described herein as having various characteristics, such as size, shape, density, arrangement and various parameters, such as L, D, minimum transverse dimension, L/D and γ. Any of these characteristics and/or parameters may also be used to describe ion-conducting passageways generally.

Each of the embodiments described above comprises a single sheet of substrate material through which ion-conducting passageways 27 are formed to provide one or more ion-conducting regions. In some embodiments of the invention, ion-conducting membranes comprise composite substrates made of multiple layers of different materials. Some layers of a composite substrate may be porous. For example, one or more layers of a composite substrate may comprise a mesh material. Other layers of such a composite substrate may comprise ion-conducting regions and ion-non-conducting regions according to a suitable one of the constructions described herein. A composite substrate fabricated in this manner may have superior mechanical strength.

Figure 6:
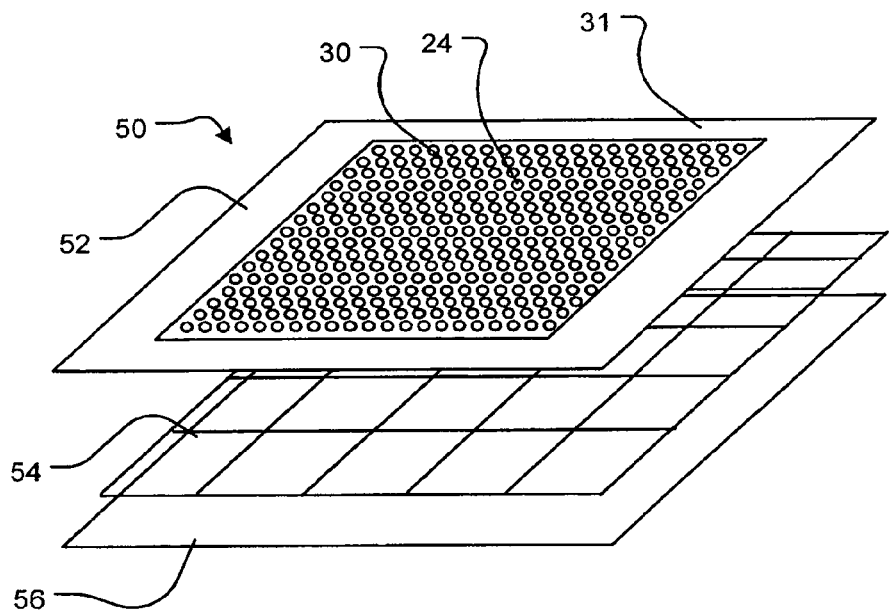
FIG. 6 is an exploded perspective view of a substrate made from a lamination of multiple sheets of precursor materials which may be used in a membrane of the type shown in FIG. 3A according to another embodiment of the invention.

FIG. 6 is an exploded view of a composite substrate 50 in accordance with a particular embodiment of the invention. Composite substrate 50 comprises a first layer 52. Layer 52 may comprise a substrate layer similar to any of those described above, for example. In the illustrated embodiment, layer 52 comprises a non-porous region 31 which surrounds a porous region 30 having openings 24 formed therein. Intermediate layer 54 comprises a mesh-like structure bonded to first layer 52 to provide structural reinforcement. Optional backing layer 56 may form a lamination, so that intermediate layer 54 is encapsulated between layers 52 and 56. A composite substrate may have more than 2 or 3 layers of substrate precursor materials.

The foregoing discussion has dealt primarily with the nature and formation of substrates comprising porous regions formed in substrate material. Ion-conducting materials, such as ionomers, can be deposited into porous regions of such substrates to form ion-conducting membranes having ion-conducting passageways for use in fuel cells, electrolysis cells and the like. Ion-conducting materials may be deposited in various arrangements on such substrates to make ion-conducting membranes according to the invention.

Figure 7A:
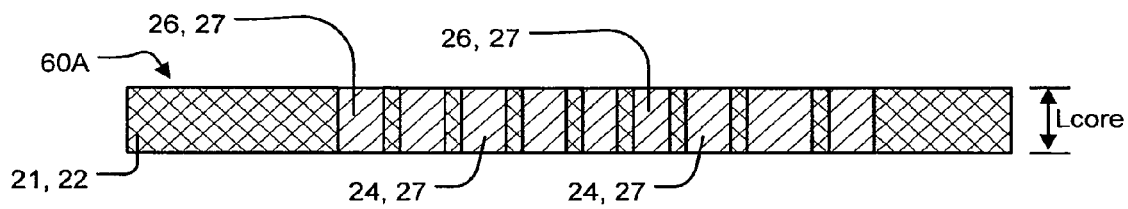
FIGS. 7A-7D are cross-sectional schematic views of ion-conducting membranes according to various embodiments of the invention.

FIGS. 7A, 7B, 7C and 7D show cross-sections of a number of exemplary ion-conducting membranes according to various embodiments of the invention. Ion-conducting material is arranged differently in each of the membranes depicted in FIGS. 7A, 7B, 7C and 7D. FIG. 7A shows a membrane 60A comprising a substrate 21 formed from a substrate material 22. Substrate 21 has openings 24 formed therein. Openings 24 of membrane 60A are filled with ion-conducting material 26 to form ion-conducting passageways 27 through membrane 60A. Ion-conducting material 26 is relatively more ion-conductive than substrate material 22. In membrane 60A, the thickness of the ion-conducting material 26 and the length of ion-conducting passageways 27 are substantially similar to the thickness $L_{core}$ of substrate 21. In other embodiments, the thickness of ion-conducting material 26 (and the ion-conducting passageways 27) differ from the thickness $L_{core}$ of substrate 21.

Figure 7B:
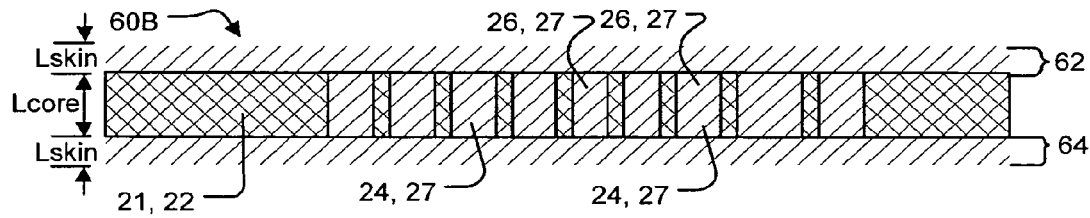

FIG. 7B shows a membrane 60B according to another embodiment of the invention. Membrane 60B has openings 24 filled with ion-conducting material 26 to form ion-conducting passageways 27. Membrane 60B also comprises ion-conducting skins 62, 64 which coat substrate material 22 on either side thereof. The ion-conducting material in each of skins 62, 64 may the same or different and may be the same as or different than the ion-conducting material 26 in openings 24. The ion-conducting material in each of skins 62, 64 is relatively more ion conductive than substrate material 22. In the FIG. 7B embodiment, the thickness $L_{skin}$ of each skin 62, 64 is substantially similar. In other embodiments, the thicknesses of skins 62, 64 differ from one another.

Coating substrate 21 with skins 62, 64 is optional. The provision of skins 62, 64 may be advantageous in that skins

62, 64 can provide ion-conducting passageways between non-porous regions and porous regions of substrate 21 (i.e. between ion-conducting and non-ion-conducting regions of membrane 60B) and between non-porous regions on opposing sides of substrate 21 (i.e. between non-ion-conducting regions on either side of membrane 60B).

Figure 7C:
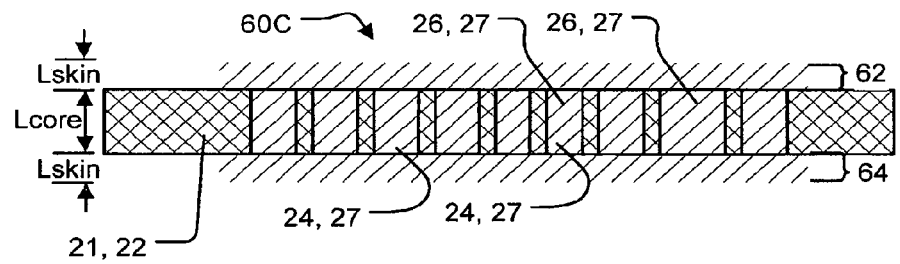

FIG. 7C shows a membrane 60C comprising a substrate 21 having openings 24 filled with ion-conducting material 26 to form ion-conducting passageways 27. Substrate 21 is coated with ion-conducting skins 62, 64. In the FIG. 7C embodiment, skins 62, 64 extend transversely over the porous region of substrate 21 and slightly into the non-porous region of substrate 21. In other embodiments, skins 62, 64 extend transversely over only a part of the porous region of substrate 21. In still other embodiments, skins 62, 62 extend transversely over only the porous region of substrate 21 and do not extend transversely into the non-porous region of substrate 21.

Figure 7D:
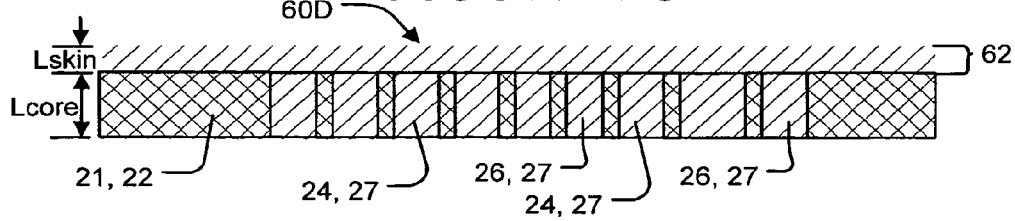

FIG. 7D shows a membrane 60D comprising a substrate material 22 having openings 24 filled with ion-conducting material 26 to form ion-conducting passageways 27 and a single ion-conducting skin 62 which coats only one side of substrate 21. Skin 62 may have different transverse extension characteristics as described above.

Figure 8A:
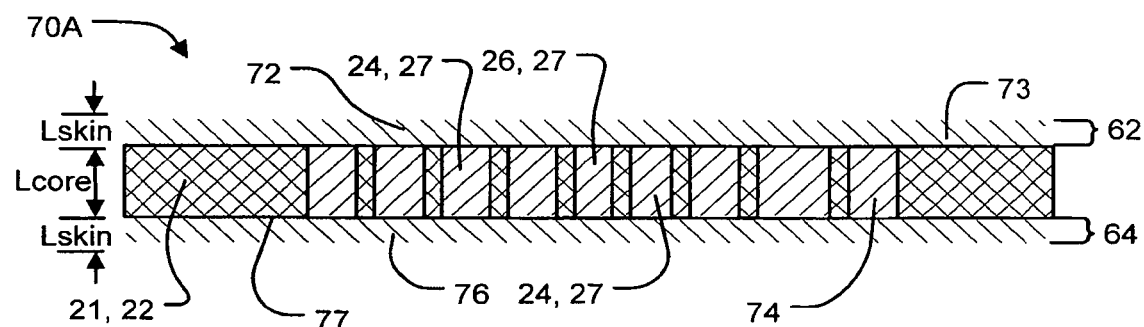
FIGS. 8A-8B are cross-sectional schematic views of ion-conducting membranes in which multiple different ion-conducting materials are applied in layers to form a composite membrane structure.

FIG. 8A shows an ion-conducting membrane 70A according to another embodiment of the invention. Membrane 70A comprises a substrate 21 made of substrate material 22 with openings 24 formed at selected locations as described above. Substrate 21 supports a plurality of ion-conducting materials of different compositions. In the FIG. 8A embodiment, membrane 70A comprises three layers of ion-conducting material including: a skin layer 62 of a first ion-conducting material 72 on a first side 73 of membrane 70A; a mid layer of a second ion-conducting material 26 different from first material 72; and a skin layer 64 of a third ion-conducting material 76 different from second material 26 (and optionally different from both first material 72 and second material 26) on a second side 77 of membrane 70A. Ion-conducting materials 72, 26, 76 are relatively more ion conductive than substrate material 22. In the FIG. 8A embodiment, skins 62, 64 both have approximately equal thickness ($L_{skin}$), but this is not necessary.

Figure 8B:
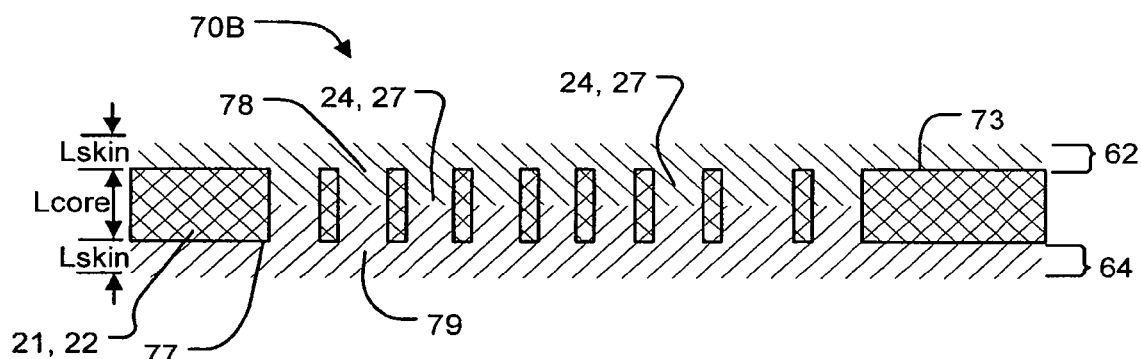

FIG. 8B shows an ion-conducting membrane 70B according to another embodiment of the invention. Membrane 70B has two ion-conducting layers 78, 79 of different ion-conducting materials. The ion-conducting material of layers 78, 79 is relatively more ion-conductive than substrate material 22.

Ion-conducting material(s) may be deposited onto and into a substrate to make an ion-conducting membrane according to the invention in any of a variety of methods including casting, dipping, printing, syringe injection and molding. Further, when one or more skins are used, it is possible to fabricate a membrane by bonding a substrate having a porous region to a pre-formed sheet of ion-conducting material (i.e. a skin) or between two pre-formed sheets of ion-conducting material. A membrane may also be formed by bonding ion-conducting sheets (skins) to a liquid precursor.

Figure 9A:
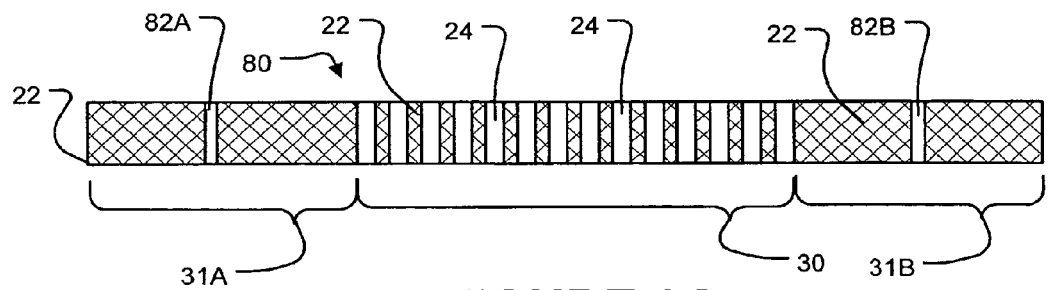
FIGS. 9A and 9B schematically depict the fabrication of an ion-conducting membrane according to a particular embodiment of the invention.
Figure 9B:
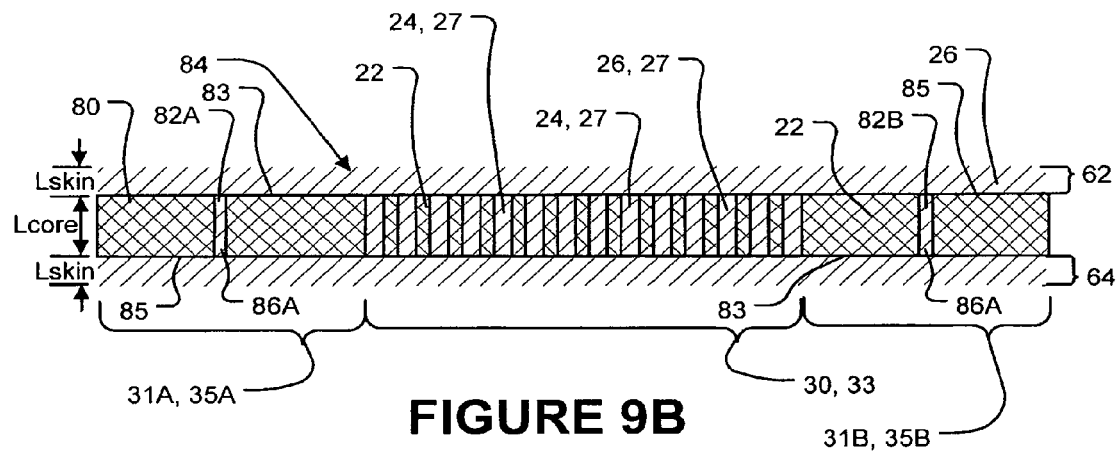

FIGS. 9A and 9B schematically depict the fabrication of an ion-conducting membrane according to a particular embodiment of the invention. FIG. 9A depicts the formation of a substrate 80. Substrate 80 comprises a substrate material 22 in which openings 24 have been formed at selected locations as described above to provide porous region 30 and non-porous regions 31A, 31B on either side thereof.

In the FIG. 9A embodiment, each of non-porous regions 31A, 31B is provided with one or more optional fabrication vias 82A, 82B. Fabrication vias 82A, 82B may be formed in the same manner as openings 24. Fabrication vias 82A, 82B are preferably spaced apart from porous region 30. In some embodiments, fabrication vias 82 are formed at locations that are transversely spaced apart from corresponding porous region(s) 30 by a distance of at least 1½L, where L is the center to center transverse spacing between nearest adjacent openings 24 in corresponding porous region(s) 30. In other embodiments, fabrication vias 82 are formed a locations that are transversely spaced apart from corresponding porous region(s) 30 by a distance of at least 3L.

FIG. 9B depicts the addition of ion-conducting material 26 to substrate 80 to form ion-conducting membrane 84 having ion-conducting passageways 27. Ion-conducting material 26 is relatively more ion-conductive than substrate material 22. In the FIG. 9B embodiment, ion-conducting material 26 is applied in such a manner (e.g. by casting) that ion-conducting material 26 coats substrate 80, filling openings 24, filling optional fabrication vias 82A, 82B (as indicated at 86A, 86B) and forming ion-conducting skins 62, 64. Optional fabrication vias 82A, 82B may provide an advantage in that when ion-conducting material 26 is applied it may be in a liquid form. Ion-conducting material 86A, 86B in fabrication vias 82A, 82B may act like anchors which provide ion-conducting material 26 with tensile strength, thereby tending to prevent deformation of ion-conducting material 26 during drying. In particular, fabrication vias 82A, 82B may improve the uniformity of skins 62, 64. Bonds between skins 62, 64 and substrate 80 (for example, at locations 83, 85) may also add tensile strength to ion-conducting material 26 and thereby reduce deformation of ion-conducting material 26 when drying.

Figure 9C:
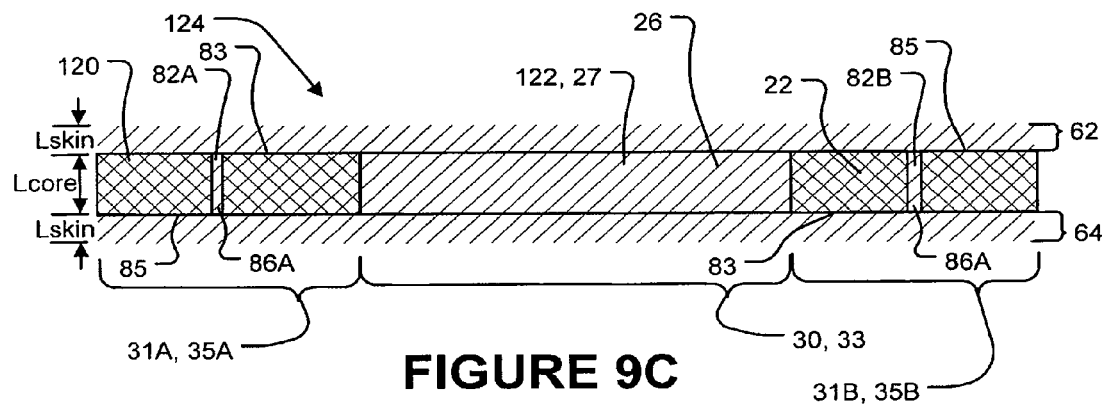
FIGS. 9C and 9D schematically depict different cross-sectional views of an ion-conducting membrane fabricated according to another embodiment of the invention.
Figure 9D:
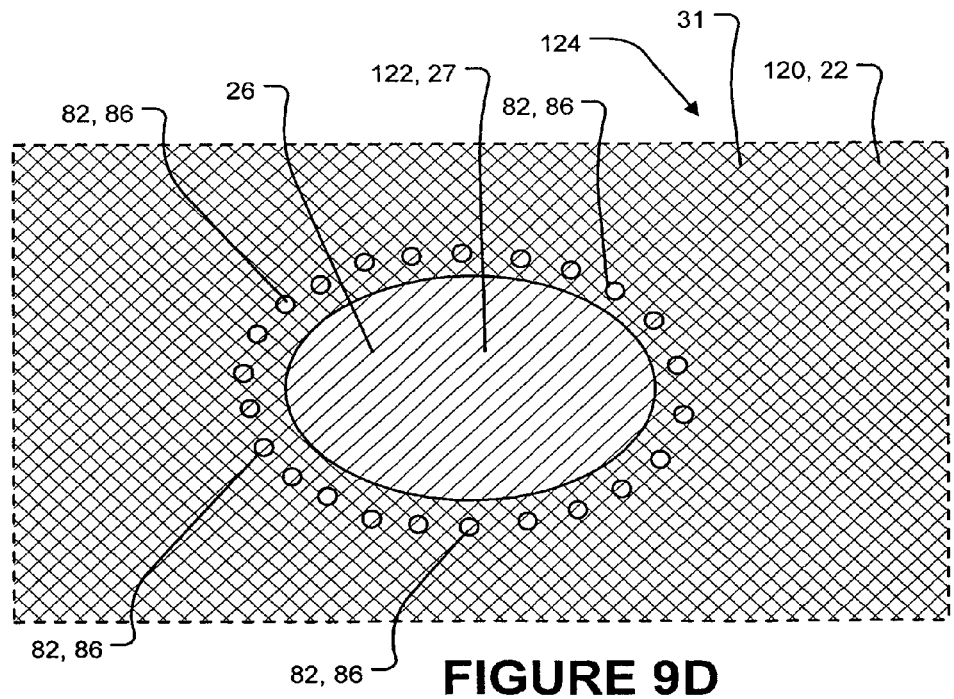

FIGS. 9C and 9D schematically depict different cross-sectional views of an ion-conducting membrane fabricated according to another embodiment of the invention. Substrate 120 comprises a substrate material 22 in which an opening 122 has been formed. Opening 122 preferably comprises a smoothly curved perimeter as shown FIG. 9D to avoid stress concentrations. Non-porous region(s) 31 adjacent opening 122 may be provided with one or more optional fabrication vias 82A, 82B (collectively, 82). Fabrication vias 82 may be formed in any suitable manner as described above and are preferably spaced apart from opening 122. In some embodiments, fabrication vias 82 are formed a locations that are transversely spaced apart from corresponding opening 122 by a distance of at least 100 microns. In other embodiments, fabrication vias 82 are formed at locations that are transversely spaced apart from opening 122 by a distance of at least 200 microns.

Ion-conducting material 26 is added to substrate 120 to form ion-conducting membrane 124 having an ion-conducting passageway 27. Ion-conducting material 26 is relatively more ion-conductive than substrate material 22. In the FIG. 9C embodiment, ion-conducting material 26 is applied in such a manner (e.g. by casting) that ion-conducting material 26 coats substrate 120, filling opening 122, filling optional fabrication vias 82 (as indicated at 86A, 86B (collectively, 86)) and forming ion-conducting skins 62, 64. As discussed above, where fabrication vias 82 are present, they may act like anchors which secure ion-conducting material 26 around the edges of opening 122. Providing such anchors can help to prevent deformation of ion-conducting material 26 during drying and makes the overall structure more rugged. Whether or not fabrication vias 82 are present, bonds between skins 62, 64 and non-porous region(s) 31 of substrate 120 (for example, at locations 83, 85) may permit adhesion of ion-conducting material 26 around the edges of opening 122 that is adequate for some applications.

The membranes described above may be formed by applying an ion-conducting material 26 to a substrate 21 in which openings 24 have been formed. Ion-conducting material 26 fills openings 24 (thereby providing ion-conducting passageways 27) and optionally provides ion-conducting skins 62, 64. In some alternative embodiments, ion-conducting membranes are fabricated by providing a sheet of substrate material and selectively converting the substrate material into a relatively ion-conducting state at selected locations to form ion-conducting passageways or by providing a sheet of ion-conducting substrate material and selectively converting the ion-conducting material to a relatively non-ion-conducting state at selected locations to form ion-conducting passageways.

Figure 10A:
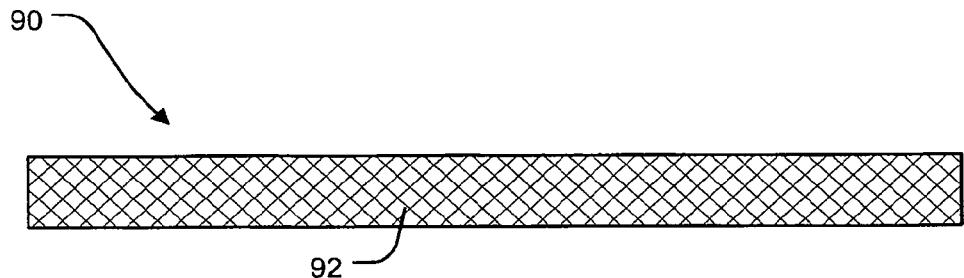
FIGS. 10A-10C schematically depict the fabrication of an ion-conducting membrane according to another embodiment of the invention.
Figure 10B:
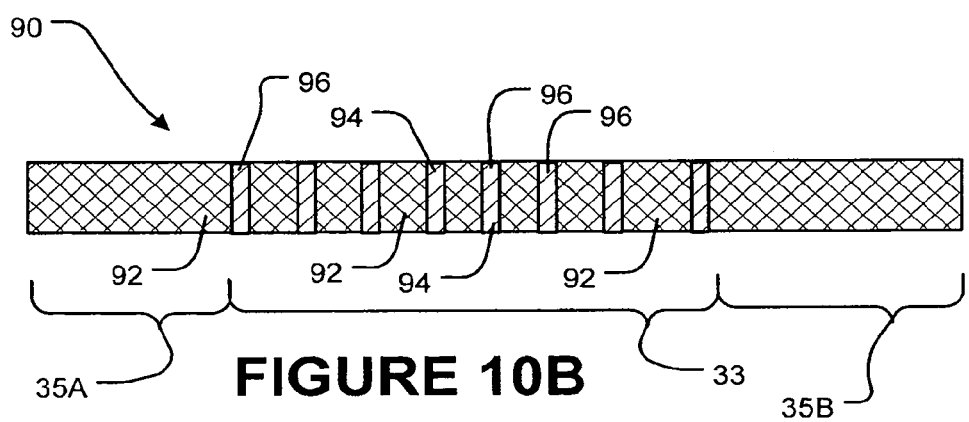
Figure 10C:
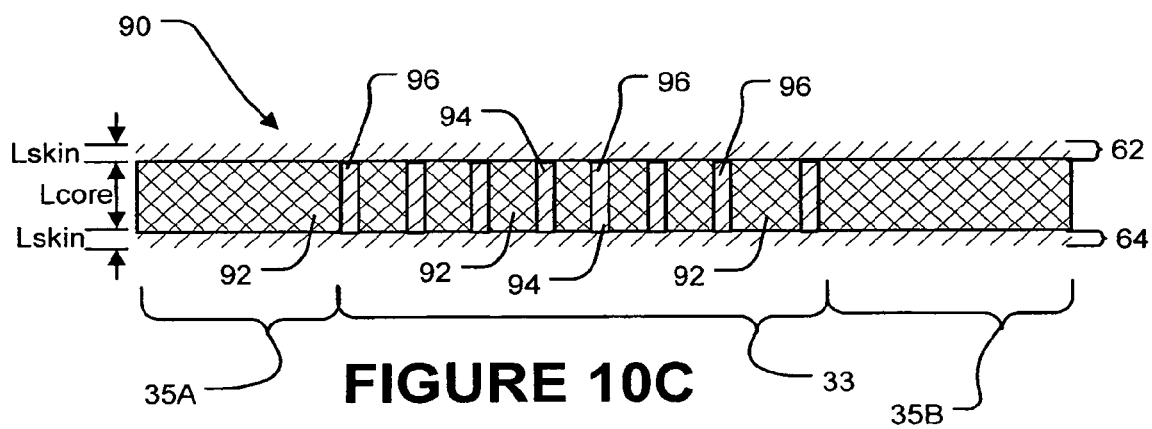

FIGS. 10A-10C schematically depict the fabrication of an ion-conducting membrane according to another embodiment of the invention. FIG. 10A depicts a sheet 90 of a substrate material 92. Substrate material 92 is preferably melt processable. In one particular embodiment, substrate material 92 comprises a resin precursor to Nafion™ which may be a copolymer of tetrafluoroethlyene and perfluoro-3,6-dioxa-4-methyl-7-octenesulfonyl fluoride. Substrate material 92 is convertible in selected locations to a relatively ion-conducting state. For example, the resin precursor to Nafion™ is convertible in selected locations to Nafion™, which conducts ions.

FIG. 10B depicts the conversion of substrate material 92 into a relatively ion-conducting state 94 in selected locations to form ion-conducting passageways 96. Ion-conducting passageways 96 provide ion-conduction paths through substrate sheet 90. Ion-conducting passageways 96 may be arranged in any suitable arrangement. for example, ion-conducting passageways 96 may be configured and arranged in any of the ways described above in relation to passageways 27. Sheet 90 may be described as having one or more ion-conducting region(s) 33 (i.e. in a vicinity of ion-conducting passageways 96) and one or more non-ion-conducting regions 35. Each of ion-conducting regions 33 comprises an array of ion-conducting passageways 96. In the FIG. 10B embodiment, non-ion-conducting regions 35A, 35B are located on either side of ion-conducting region 33.

Substrate material 92 may be converted to a relatively ion-conducting state to form ion-conducting passageways 96 using any suitable technique. By way of non-limiting example, ion-conducting passageways 96 may be formed by selectively exposing areas of substrate sheet 90 to chemicals, radiation, heat or the like. Masks may be used to selectively expose areas of substrate sheet 90 to chemicals, radiation, heat or the like. Other lithographic, etching and or printed circuit board fabrication techniques may also be used.

In one particular embodiment, where non-ion-conducting material 92 is a resin precursor to Nafion™, conversion of non-ion-conducting material 92 into an ion-conducting material 94 in the selected locations of ion-conducting passageways 96 may comprise masking sheet 90 and selectively hydrolyzing areas of sheet 90 by exposure to water.

Ion-conducting membranes formed by selective conversion of a substrate material may be tailored to provide different spatial membrane regions with different ion conductivity and/or mechanical characteristics to suit particular applications. For example, ion-conducting passageways 96 formed by selective conversion may be formed to have characteristics (e.g. size, shape, density and/or arrangement) and/or parameters (e.g. L, D, L/D, γ) similar to openings 24 (and/or ion-conducting passageways 27) described above. Ion-conducting passageways 96 may have different characteristics and/or parameters in different regions of sheet 90. Such different characteristics and/or parameters may vary smoothly or may vary discretely. Sheet 90 may be fabricated from a plurality of layers in accordance with the embodiments described above. One or more layers may be added to sheet 90 as described above.

FIG. 10C depicts the application of optional skins 62, 64 of ion-conducting material to sheet 90. Skins 62, 64 may be applied using any of the techniques described above, for example.

Those skilled in the art will appreciate that there are energy losses associated with the conduction of ions through the membranes described above. In some cases, it is desirable to minimize the losses associated with the conduction of ions through a membrane (or a portion of a membrane). Referring to the embodiment of FIG. 7B as an example, the inventors have determined, that for a given core thickness $L_{core}$ and parameter ratio L/D, there is an optimal skin thickness $L_{skin}$ which provides minimum losses across membrane. If the skin thickness $L_{skin}$ is below the optimum level, then the overall membrane losses will be relatively high and will increase with further decreases in skin thickness $L_{skin}$ below the optimum level. Conversely, if the skin thickness $L_{skin}$ is above the optimum level, then the overall membrane losses will be relatively high and will increase with further increases in skin thickness $L_{skin}$ above the optimum level.

In some embodiments of the invention, the optimum skin layer thickness $L_{skin}$ is in a range of 5-50 microns. In some embodiments, the optimum skin layer thickness $L_{skin}$ is in a range of 0.25 to 5 times the thickness of the core layer $L_{core}$.

The ion-conducting membranes disclosed above are capable of providing desired conductivity, gas permeability and mechanical strength characteristics that can be varied at the designer's discretion over the spatial extent of the membrane. This affords a designer great design flexibility and allows the local tuning of mechanical and electrical parameters to best meet the competing needs of ion conductivity and mechanical strength within a fuel cell or similar system.

The invention may be provided in the form of electrochemical cells of any suitable type which incorporate membranes according to the invention. Some embodiments of the invention provide fuel cells or membrane-electrode assemblies for fuel cells.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A membrane comprising:
   a substrate including at least one ion-conducting substrate region in which ions can pass through the substrate and at least one non-ion-conducting substrate region in which the ions cannot pass through the substrate;
   wherein the at least one ion-conducting substrate region includes two or more ion-conducting passageways that extend through the ion-conducting substrate region of the substrate; and wherein the ion-conducting passageways contain an ion-conducting material that is relatively more ion-conductive than the non-ion-conducting substrate region of the substrate, and wherein the at least one ion-conducting region is surrounded by the non-ion-conducting region, and wherein the substrate of the at least one ion-conducting substrate region and the substrate of the non-ion-conducting substrate region is formed of the same material.

2. The membrane of claim 1, wherein the at least one ion-conducting substrate region includes a plurality of ion-conducting passageways.

3. The membrane of claim 1, wherein each of the ion-conducting passageways penetrates the substrate substantially perpendicularly.

4. The membrane of claim 1, wherein each of the ion-conducting passageways comprises a hole cleanly cut directly through the substrate.

5. The membrane of claim 1, wherein the substrate comprises a substantially non-porous region corresponding to the non-ion-conducting substrate region of the membrane.

6. The membrane of claim 5, wherein the ion-conducting substrate region is surrounded by the substantially non-porous region of the substrate.

7. The membrane of claim 1, wherein each ion-conducting passageway has a maximum transverse dimension (D) that is less than or equal to about 2500 microns.

8. The membrane of claim 1, wherein a transverse center to center spacing between nearest neighboring ion-conducting passageways (L) is less than or equal to about 5000 microns.

9. The membrane of claim 1, wherein a maximum transverse dimension (D) of each ion-conducting passageway and a transverse center to center spacing between nearest neighboring ion-conducting passageways (L) are selected such that a parameter ratio (L/D) is less than or equal to about 2.5.

10. The membrane of claim 1, wherein each ion-conducting passageway has a transverse cross-sectional area less than or equal to about $1 \times 10^{-5}$ m$^2$.

11. The membrane of claim 1, wherein a ratio of a total transverse cross-sectional area of the ion-conducting region to a total transverse cross-sectional area of the ion-conducting passageways is less than or equal to about 2.5.

12. The membrane of claim 1, wherein a minimum transverse dimension of each ion-conducting passageway is greater than about 25 microns.

13. The membrane of claim 1, wherein the ion-conducting passageways include passageways having transverse cross-sections that include at least one of a: substantially circular, substantially hexagonal, substantially rectangular, and substantially slit-shaped.

14. The membrane of claim 1, wherein the ion-conducting passageways comprise micro-structured passageways.

15. The membrane of claim 1, further comprising one porous region corresponding to each of the ion-conducting substrate regions.

16. The membrane of claim 1, comprising a first skin layer of ion-conducting material located on a first side of the substrate, wherein the ion-conducting material of the first skin layer is in contact with the ion-conducting material of at least one of the ion-conducting passageways.

17. The membrane of claim 16, wherein the ion-conducting material in the first skin layer is the same as the ion-conducting material in the ion-conducting passageways.

18. The membrane of claim 16, wherein the ion-conducting material in the first skin layer is different from the ion-conducting material in the ion-conducting passageways.

19. The membrane of claim 16, wherein the ion-conducting material in the first skin layer is different than the ion-conducting material in the second skin layer.

20. The membrane of claim 16, comprising a second skin layer of ion-conducting material located on a second side of the substrate, wherein the ion-conducting material of the second skin layer is in contact with the ion-conducting material of at least one of the ion-conducting passageways.

21. The membrane of claim 20, wherein the first and second skin layers have thicknesses ($L_{skin}$) that are substantially the same.

22. The membrane of claim 20, wherein the first and second skin layers have thicknesses ($L_{skin1}$ and $L_{skin2}$) that are less than about 50 microns.

23. The membrane of claim 20, wherein the first and second skin layers each comprise the same ion-conducting material.

24. The membrane of claim 20, wherein the substrate has a thickness ($L_{core}$), the first and second skin layers have thicknesses ($L_{skin1}$ and $L_{skin2}$), and wherein a ratio of the thicknesses ($L_{skin1}$ and $L_{skin2}$) of the first and second skin layers to the thickness ($L_{core}$) of the substrate is less than about 5.

25. The membrane of claim 1, comprising a first skin layer of ion-conducting material, the first skin layer located on a first side of the substrate and extending transversely over at least a first portion of a porous region of the substrate such that the ion-conducting material of the first skin layer is in contact with the ion-conducting material of at least one of the ion-conducting passageways.

26. The membrane of claim 25, comprising a second skin layer of ion-conducting material, the second skin layer located on a second side of the substrate and extending transversely over at least a second portion of the porous region of the substrate such that the ion-conducting material of the second skin layer is in contact with the ion-conducting material of at least one of the ion-conducting passageways.

27. The membrane of claim 26, wherein at least one of the first or second skins extends transversely over the porous region of the substrate and at least partially over the non-porous-region of the substrate.

28. The membrane of claim 1, wherein the substrate comprises a plurality of layers.

29. The membrane of claim 28, wherein at least one of the plurality of layers of the substrate comprises a mesh material.

30. The membrane of claim 1, wherein the substrate includes two or more ion-conducting substrate regions and wherein each of the ion-conducting substrate regions are transversely spaced apart from one another.

31. The membrane of claim 1, wherein the substrate comprises a polymer film.

32. The membrane of claim 1, wherein the substrate comprises a copolymer of tetrafluoroethlyene and perfluoro-3,6-dioxa-4-methyl-7-octenesulfonyl fluoride.

33. The membrane of claim 1, wherein the substrate comprises a sheet of substantially non-ion-conducting material and wherein the passages comprise a hydrolyzed form of the substantially non-ion-conducting material that is ion-conducting.

34. The membrane of claim 1, wherein the ion-conducting passageways and substrate are formed of a material having an ion-conducting form and a non-ion-conducting form, wherein the passageways comprise the ion-conducting form of the material and the substrate surrounding the passageways comprises the non-ion-conducting form of the material.

35. The membrane of claim 1, wherein the ion-conducting material comprises an ionomer.

36. The membrane of claim 1, wherein the ion-conducting material provides a first skin layer on a first side of the substrate, the first skin layer extending transversely past a perimeter of an opening of the ion-conducting passageways.

37. The membrane of claim 36, comprising a second skin layer of ion-conducting material on a second side of the substrate, the ion-conducting material in the second skin layer contiguous with the ion-conducting material in the vias.

38. The membrane of claim 1, wherein the ion-conducting passageways are arranged to form an ordered array.

39. The membrane of claim 1, comprising first and second major surfaces.

40. The membrane of claim 39, wherein the ion-conducting substrate regions of the membrane permit ions to pass through the membrane between the first and second major surfaces and the ion-conducting passageways have an ion-conductivity that is greater than an ion-conductivity of portions of the substrate that surround the passageways, and wherein the membrane separates a first reactant manifold and a second reactant manifold.

41. The membrane of claim 40, wherein the ion-conducting passageways are arranged in a regular array in the ion-conducting regions.

42. The membrane of claim 40, wherein the first and second reactant manifolds respectively comprise a fuel manifold and an oxidant manifold.

43. A method for manufacturing a membrane, comprising:
    forming a plurality of passageways in at least one region of a substrate; and
    disposing an ion-conducting material in the plurality of passageways, sufficient to form at least one ion-conducting substrate region and at least one non-ion conducting substrate region in the substrate, wherein each of the at least one ion-conducting substrate regions include two or more passageways, and wherein each of the at least one ion-conducting substrate regions are surrounded by the non-ion-conducting region, and wherein the substrate of the at least one ion-conducting substrate region and the substrate of the non-ion-conducting substrate region is formed of the same material.

44. The method of claim 43, wherein the passageways are formed by chemical etching, laser micromachining, laser drilling, mechanical drilling, milling, punching, calendaring, printed circuit board fabrication techniques, or combinations thereof.

45. The method of claim 43, wherein disposing comprises casting, dipping, printing, syringe injecting, molding, or combinations thereof.

46. The method of claim 43, wherein the ion-conducting material is applied in a manner sufficient to coat the substrate, fill the plurality of passageways, and form ion-conducting skins in the plurality of ion-conducting substrate regions.

47. The method of claim 46, comprising forming the ion-conducting skins transversely over the ion-conducting substrate regions of the substrate and at least partially over the non-ion-conducting region of the substrate.

48. The membrane of claim 1, wherein the membrane includes a first side and a second side, and wherein the substrate includes a plurality of ion-conducting regions and the ion-conducting regions are surrounded by the at least one non-ion-conducting region, and wherein each ion-conducting region includes two or more of the ion-conducting passageways, and wherein the first side of the membrane provides ion-conducting surface regions that correspond to the ion-conducting regions of the substrate.

49. The method of claim 43, wherein the ion-conducting substrate regions are surrounded by the at least one non-ion-conducting substrate region and wherein a first side of the membrane provides ion-conducting surface regions that correspond to the ion-conducting substrate regions and the first side of the membrane provides a non-ion-conducting surface region corresponding to the non-ion-conducting substrate region.

50. The method of claim 43, wherein the membrane includes at least two ion-conducting substrate regions and wherein each of the ion-conducting substrate regions are spaced apart from one another.

* * * * *

UNITED STATES PATENT AND TRADEMARK OFFICE
CERTIFICATE OF CORRECTION

PATENT NO.        : 8,551,637 B2  
APPLICATION NO.   : 12/126811  
DATED             : October 8, 2013  
INVENTOR(S)       : McLean et al.

Page 1 of 1

It is certified that error appears in the above-identified patent and that said Letters Patent is hereby corrected as shown below:

In the Specifications

In column 8, line 59, delete "the" and insert --be--, therefor

In column 9, line 15, before "extend", delete "62" and insert --64--, therefor

In column 11, line 21, delete "tetrafluoroethlyene" and insert --tetrafluoroethylene--, therefor In column 11, line 32, delete "arrangement." and insert --arrangement,--, therefor In column 11, line 49, delete "and or" and insert --and/or--, therefor In the Claims In column 14, line 45, in Claim 32, delete "tetrafluoroethlyene" and insert --tetrafluoroethylene--, therefor Signed and Sealed this  
Eighteenth Day of March, 2014

Michelle K. Lee  
*Deputy Director of the United States Patent and Trademark Office*